(12) United States Patent
Schenk

(10) Patent No.: US 6,252,381 B1
(45) Date of Patent: Jun. 26, 2001

(54) METHOD FOR REGULATING A GENERATOR CAPABLE OF BEING DRIVEN BY AN INTERNAL COMBUSTION ENGINE

(75) Inventor: Robert Schenk, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/463,637

(22) PCT Filed: May 14, 1998

(86) PCT No.: PCT/DE98/01339

§ 371 Date: Jan. 24, 2000

§ 102(e) Date: Jan. 24, 2000

(87) PCT Pub. No.: WO99/02641

PCT Pub. Date: Feb. 11, 1999

(30) Foreign Application Priority Data

Aug. 1, 1997 (DE) .............................. 197 33 212

(51) Int. Cl.$^7$ ....................................... H02P 9/00
(52) U.S. Cl. ................ 322/28; 322/20; 322/25; 363/145
(58) Field of Search ................. 322/19, 20, 22, 322/25, 27, 28, 29; 363/145

(56) References Cited

U.S. PATENT DOCUMENTS

| | | | |
|---|---|---|---|
| 4,733,159 | * 3/1988 | Edwards et al. ................ | 323/282 |
| 5,543,703 | * 8/1996 | Kusase et al. .................. | 322/16 |
| 5,608,616 | * 3/1997 | Umeda et al. ................... | 363/132 |
| 5,719,484 | * 2/1998 | Taniguchi et al. ............... | 322/20 |
| 5,719,760 | * 2/1998 | Umeda et al. ................... | 363/145 |
| 5,726,557 | * 3/1998 | Umeda et al. ................... | 322/21 |
| 5,726,558 | * 3/1998 | Umeda et al. ................... | 322/27 |
| 5,726,559 | * 3/1998 | Taniguchi et al. ............... | 322/34 |
| 5,731,689 | * 3/1998 | Sato .............................. | 322/25 |
| 5,739,677 | * 4/1998 | Tsutsui et al. .................. | 322/25 |

FOREIGN PATENT DOCUMENTS 196 460 43   11/1996 (DE) .

* cited by examiner

Primary Examiner—Nicholas Ponomarenko
(74) Attorney, Agent, or Firm—Michael J. Striker

(57) ABSTRACT

A method is described for regulating a generator, in particular a three-phase generator which has an excitation coil through which the regulatable excitation current (IE) used to generate the excitation field flows, and has stator coils in which currents are produced that are conveyed to the consumers via pulse inverters. By controlling the pulse inverters, the stator current can be impressed with respect to value and phase in relation to the excitation current so that the output power of the generator is optimized in the required speed range.

13 Claims, 5 Drawing Sheets

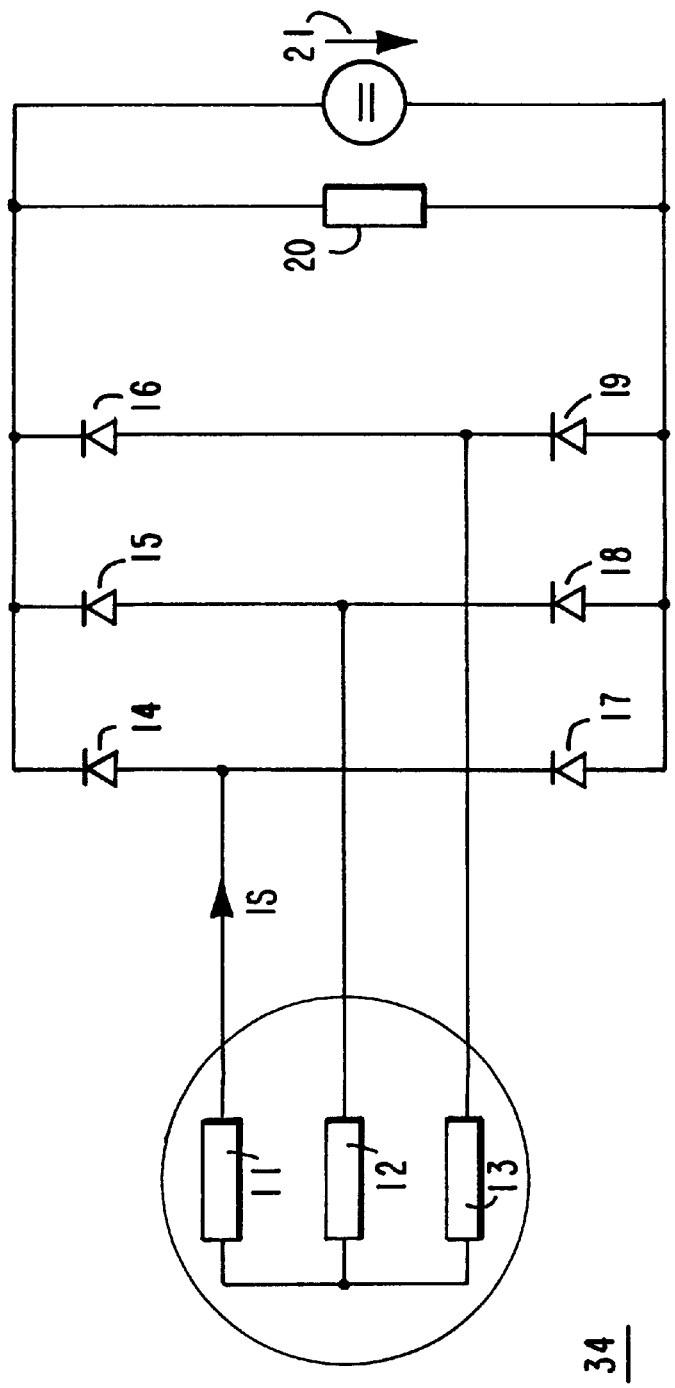
FIG. 1
PRIOR ART
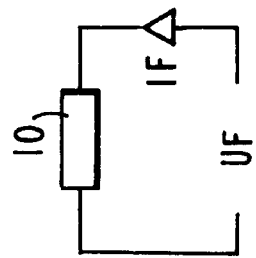

METHOD FOR REGULATING A GENERATOR CAPABLE OF BEING DRIVEN BY AN INTERNAL COMBUSTION ENGINE

The invention is based on a method for regulating a generator that can be driven by an internal combustion engine, in particular a three-phase generator in a motor vehicle, as generically defined by the preamble to the main claim.

PRIOR ART

Currently, claw-pole generators are usually used to produce the electrical energy required in a motor vehicle. These claw-pole generators are three-phase generators whose output current is rectified with the aid of a diode bridge and is used to supply the electrical consumers of the vehicle as well as for charging the battery. The essential components of a three-phase generator are shown in FIG. 1. The excitation current or field current IF flows through the excitation coil 10, which is also called a field coil. The voltage of the excitation coil 10 is the field voltage UF.

The current flowing through the excitation coil 10 induces a magnetic field in the stator coils 11, 12, 13. The flux change produces an induced voltage in the stator coils which drives a voltage IS through the diodes 14 to 19 in the on-board network. This current is used to supply the consumers 20 and the battery 21. The battery voltage is labeled UB. The current flow through the field winding 10 is usually regulated with the aid of a voltage regulator, not shown here, so that the desired voltage is present at the output of the generator. Usually the entire system with the excitation coil 10 and the stator coils 11 to 13 is referred to as a generator 34.

With a generator and the associated rectifier circuit as shown in FIG. 1, a power output only begins after a certain speed has been achieved. This speed depends on the dimensioning of the generator, and in particular, on the embodiments of the stator coils. The speed at which the generator begins to output power or the speed at which a current flow begins is the so-called switch-on speed nE.

The relationship between the power Pe in kW output by the generator and the generator speed n in rpm is shown in FIG. 3 for a conventional generator. The lower (solid) curve stands for an output voltage of 14 V; the upper (dashed) curve stands for an output voltage of 28 V. In addition, the so-called tangent line TG has been plotted on the graph. With a 14 V output voltage, the tangent point is disposed at a generator speed of n1=approx. 1500/min. The calculation of the power output as a function of the speed for the output voltages 14 V and 28 V, which are indicated in FIG. 3, was carried out with constant parameters. In particular, the following parameters were selected:

stator leakage inductance: 19 $\mu$H
stator shunt inductance: 47 $\mu$H
stator series inductance: 77 $\mu$H
stator resistance: 12 m$\Omega$
excitation current: 3.5 A The diodes and switches were assumed to be n ideal components. All calculations were carried out in phasor diagrams.

As can be inferred from FIG. 3, at speeds below 1500 rpm, a conventional three-phase generator only produces a low output. At low speeds of this kind, the generator can only output a very low current. In order for a current flow to start, the instantaneous values of the rectified generator voltage must be greater than the on-board network voltage. Only when this prerequisite is met can the generator even produce a current (of any consequence) in the first place. As the speed increases so does the voltage that the excitation coil 10 induces in the stator windings 11, 12, and 13, which is called the synchronous generated voltage. Accordingly, as the speed increases, so does the generator current. At a high speed, the terminal voltage present at the output of the stator coils is very low in relation to the synchronous generated voltage so that the generator is operated almost at a short circuit. For these reasons, the power output can only be increased insignificantly as the speed increases.

At the short circuit point, the power output of the generator can be increased considerably by virtue of the fact that the on-board network voltage is increased. With a doubled voltage, i.e. with a 28 V output voltage in the generator, the power output for high speeds is approximately twice as high as with a 14 V generator voltage. The doubling of the output power is produced because the short circuit current has been achieved once more. In lieu of a doubling of the generator voltage, a halving of the winding count also leads to a doubling of the output current and therefore to a doubling of the power. The two methods magnetically produce the same states in the generator. Therefore, the considerations stated below will be explained for only one method, namely for the voltage doubling with an unchanged winding count.

As explained above, a doubling of the generator voltage at high speeds leads to a considerable power increase. At low generator speeds, however, the voltage increase leads to a disadvantage. The switch-on speed nE at which the output of current begins is proportional to the battery voltage. With an increase in the battery voltage, the switch-on speed is consequently also increased and at low generator speeds, no power is output. Since conventional generators must be designed for speeds from approx. 1800 to 6000 rpm, problems can arise in the lower speed range. The tangent point is the contact point with the characteristic curve of the generator, which is understood to be the characteristic curve of the generator power over generator speed, with an origin line that is as steep as possible. As can be inferred from FIG. 3, with a simple battery voltage, the tangent point is disposed at approx. 1500 rpm. Since the tangent points for different battery voltages are disposed on a line, it turns out that with a doubled battery voltage, the tangent point is reached at twice as high a speed n2. At the speed n1, the power output of this generator is equal to zero at 28 V (see FIG. 3).

Since sometimes speeds even lower than 1800 rpm need to be permitted as a generator operating speed, the battery voltage would have to be reduced in order to move the tangent point toward the lower speeds. Alternatively, the winding count could also be increased. In both instances, though, the maximal generator power decreases and therefore these generator changes are not possible. On the other hand, future generators will have to produce more power. With required outputs of over 5 kW, the generators would have to be enlarged. But since the claw geometry does not permit any elongation of the claws due to the speed rating and it is not possible to increase the stator bore diameter, the current proposal is to use double generators, but these are expensive and have the disadvantage of a relatively high moment of inertia.

Another known possibility for power increase is comprised in adapting the terminal voltage of the generator to the respective requirements. This path is also called generator operation with free voltage. The generator then functions on a capacitor and a d.c. voltage converter transforms the power into the on-board network and in this connection, stabilizes its voltage at 14 V, for example. Through the selection of a suitable voltage for the respective speed, the generator can function at the tangent point at every speed. For speeds that are greater than the speed at the tangent point n1 with 14 V and n2 with 28 V, the capacitor voltage should be selected as greater than the on-board network voltage. The d.c. voltage converter that converts the capacitor voltage into the on-board network voltage must therefore function as a reduction device and convert the voltage from higher to lower values. For speeds that are lower than the respective speed n1 or n2, the d.c. voltage converter must function as an increase device. Therefore a d.c. voltage converter must be used which converts the low capacitor voltage into the higher on-board network voltage.

This known embodiment with the variable generator voltage combines the advantages of both battery voltages according to FIG. 3, since both tangent points can be approached. At a higher speed, therefore, a high power output is achieved, while at the speed n1, considerable power can still be output.

Examined German patent DE-P 196 460 43 has disclosed generator which can be operated at a higher voltage and has a capacitor whose voltage can be changed with the aid of a voltage converter. The disadvantage of an embodiment of this kind, which functions with a generator, an intermediary circuit capacitor, and a voltage converter is the concatenation of the efficiencies, which leads to a decrease in the overall efficiency of the system. For example, the reduction device must be designed for a wide voltage range, which makes optimization difficult. A 90% efficiency represents an upper limit. During such an operation, the generator can achieve efficiencies of up to 80%, the overall efficiency therefore is only 70%. Another disadvantage of this known embodiment is that the reduction device is large, expensive, and heavy since in contains a number of power switches, capacitors, and a coil.

A known system of this kind is also shown in FIG. 5. In addition to the components of the system according to FIG. 1, it also has the d.c. voltage converter 23 and the capacitor 24. In lieu of a purely passive diode rectifier bridge, the voltage supply device known from DE-P 196 460 43 has a pulse inverter with 6 pulse inverter elements that can be controlled with the aid of an electronic device. With regard to the control or regulation strategy, DE-P 196 460 43 only suggests that even in generator operation, the voltage can be adapted to the requirements within certain limits by virtue of the fact that suitable controls of the pulse inverters take place.

ADVANTAGES OF THE INVENTION

The method according to the invention for regulating a generator, with the features of claim 1, has the advantage over the embodiments known from the prior art that the power output of the generator is significantly increased in the lower speed range without the power being impaired at higher speeds.

This advantage is achieved by virtue of the fact that in a three-phase generator with an excitation coil and stator coils, the stator current can be impressed with respect to value and phase as a function of selectable variables, wherein the current impression takes place with the aid of pulse inverters that are controlled by a regulating device. In a particularly advantageous manner, the current impression with respect to value and phase in relation to the excitation current permits an operation which, through the control of the pulse inverters, allows the terminal voltage of the generator to be freely adjusted, wherein this adjustment can occur between the maximal possible terminal voltage and zero.

Other advantages of the invention are achieved through the features disclosed in the dependent claims. One decisive advantage is that at higher voltages, for example at voltages that correspond to twice the battery voltage, particular power increases are possible in the lower speed range. The switch-on speed, which would likewise have doubled in a doubling of the voltage, is thus advantageously reduced to the point that the generator can follow along the so-called moment line when the pulse inverter is operating. The magnetic properties of the generator thereby remain advantageously unaffected.

Power MOSFETs or similar switches are advantageously used as pulse inverters. These components advantageously have an inverse diode already integrated into them or are operated in reverse for the rectifier operation. The production of control impulses can advantageously take place in a regulating device which functions in a microprocessor-controlled manner and also influences the excitation current. The excitation current is advantageously taken from the on-board network, in particular from the battery.

DRAWINGS

An exemplary embodiment and the prior art are shown in the drawings and will be explained in detail in the description.

FIG. 1 shows a known circuit of a generator, the rectifier bridge, and essential components of the on-board network.

DESCRIPTION OF THE EXEMPLARY EMBODIMENTS

Figure 2:
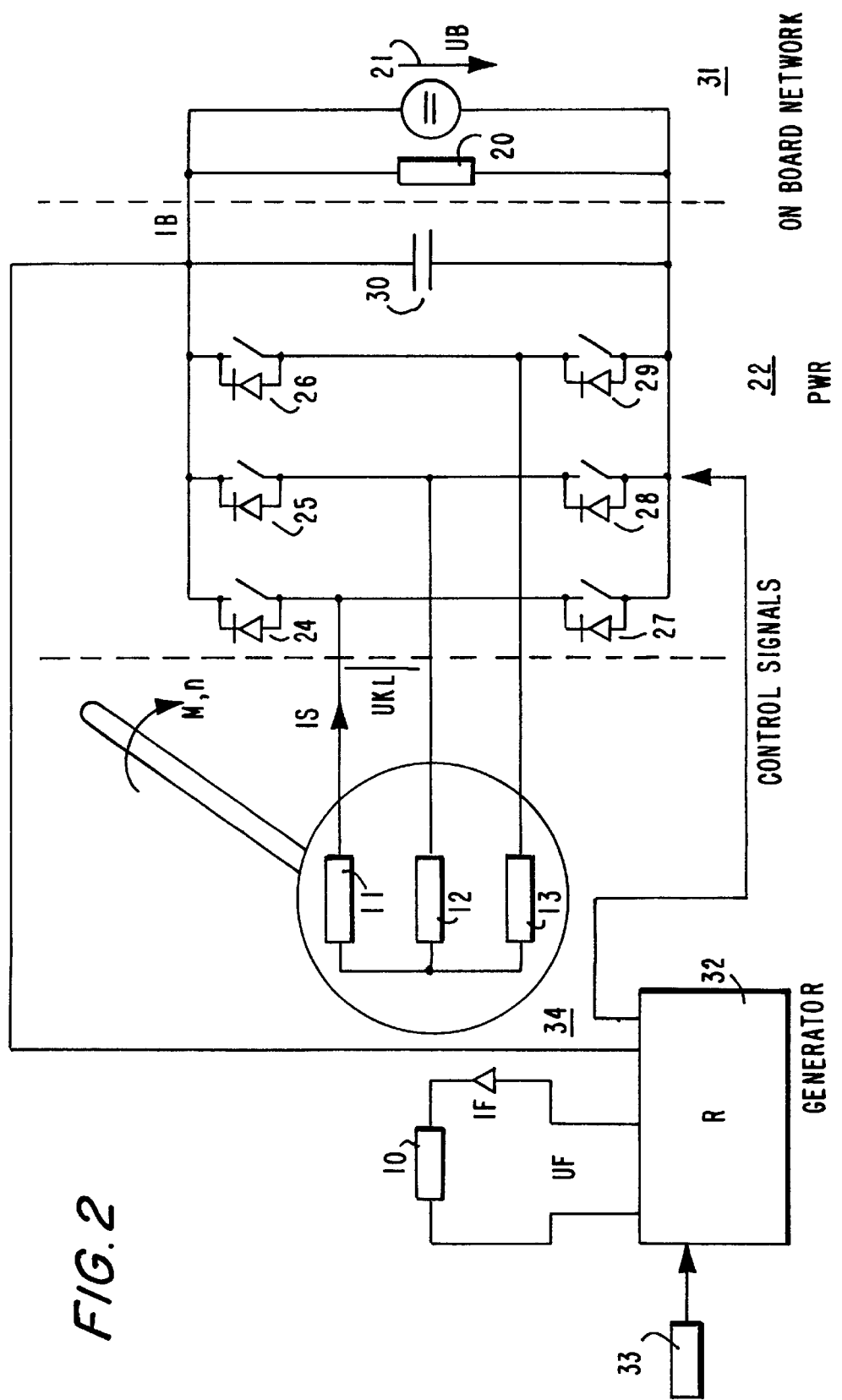
FIG. 2 shows a generator according to the invention, including the pulse inverter.
Figure 3:
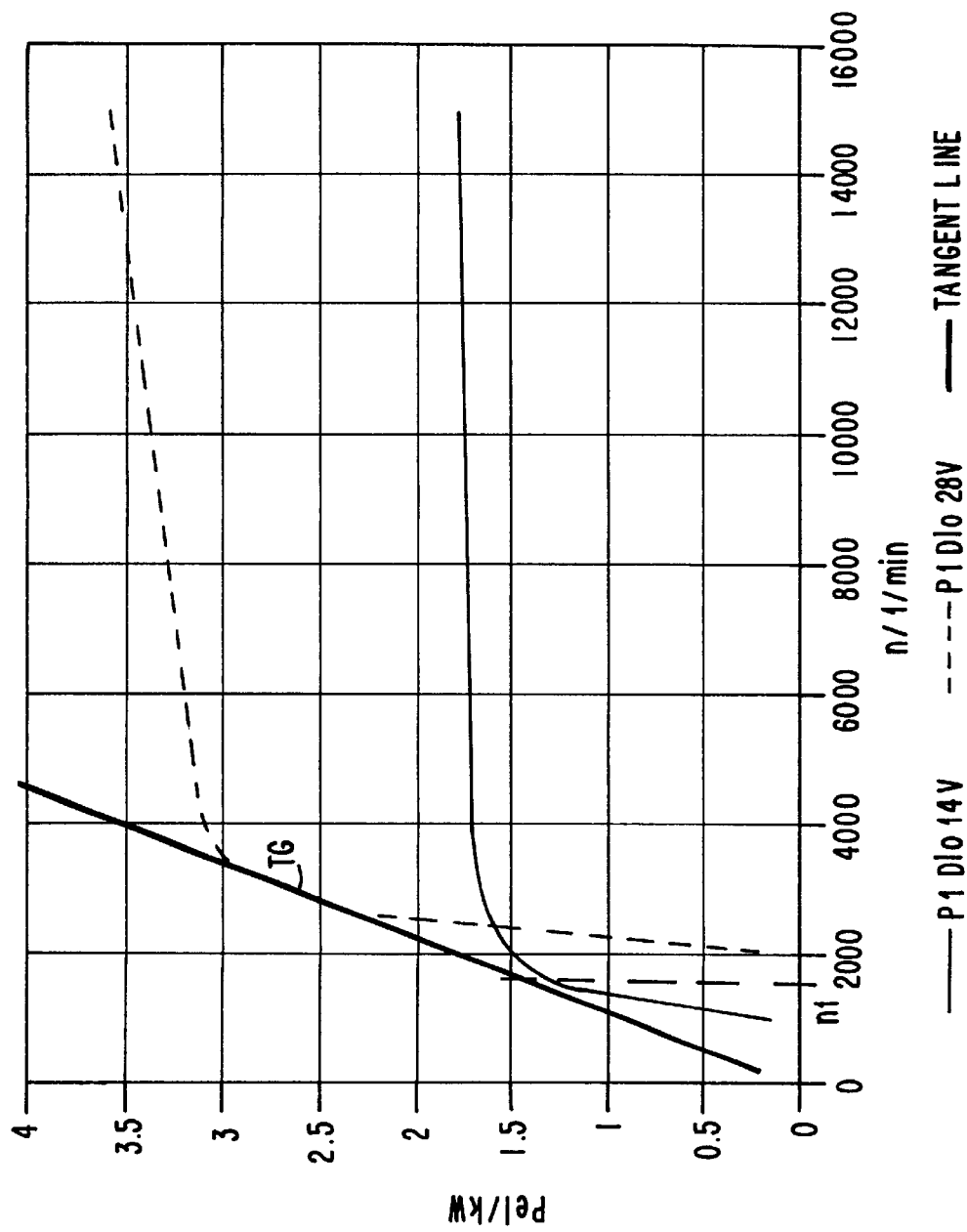
FIG. 3 shows a relationship between the output power of the generator and the generator speed for two different output voltages.

FIG. 2 shows a generator as well as the associated control circuit for carrying out a method according to the invention. For its part, the generator 34 includes the excitation coil 10 and the stator coils 11, 12, and 13. The field current IF flows through the excitation or field coil 10. The voltage present in the excitation coil is labeled UF.

The generator 34 is driven by the engine, which is not shown. In so doing, the engine exerts the moment M, which produces the generator speed n. When the generator is rotating, the stator coils produce the current IS. The terminal voltage UKL is produced between the generator terminals and can be adjusted with the aid of the pulse inverter 22. The pulse inverter 22 includes 6 pulse inverter elements 24 to 29, which are embodied for example as MOSFET switches. When the generator is rotating, the on-board network current IB required for the on-board network is produced. The voltage produced is temporarily stored in a capacitor 30, and travels from there to the consumers 20 and to the battery 21 of the on-board network 31.

The control of the pulse inverter elements 24 to 29 and the regulation of the field current IF are carried out by means of the field or excitation winding 10 by a regulating device 32 which includes a microprocessor, for example, which evaluates supplied data, e.g. signals of a speed sensor 33, and sends suitable control signals, e.g. for the pulse inverter. By means of the regulating device 32, the battery voltage UB or a voltage UF that can be derived from the battery voltage UB by the regulating device 32 can be supplied to the excitation winding 10. The regulating strategy will be explained in detail below.

In the event that the on-board network voltage is increased or the winding speed is reduced, the use of a pulse inverter 22 in lieu of a purely passive diode rectifier permits the same power increase as a generator operation with free voltage. However, a better efficiency and a considerably higher power yield is achieved at a lower generator speed.

With the use of diodes in the rectifier bridge, the stator current IS flowing in the stator windings and its angle in relation to the excitation or field current IF are adjusted so that the terminal voltage UKL corresponds to the converted on-board network voltage. However, there are a large number of other currents and angles that likewise fulfill this relation. Each current and its associated angle determine a particular terminal output. The use of a pulse inverter 22 or a bridge circuit comprised of the pulse inverter elements 24 to 29 permits a current impression with respect to value and phase, which makes the mode of operation according to the invention possible. This new mode of operation makes it possible for the pulse inverter 22 to now be able to freely adjust the terminal voltage UKL between the maximal possible terminal voltage. For example, in a conventional on-board network, the maximal possible terminal voltage is:

$$14V * \frac{\pi}{3}.$$

Figure 4:
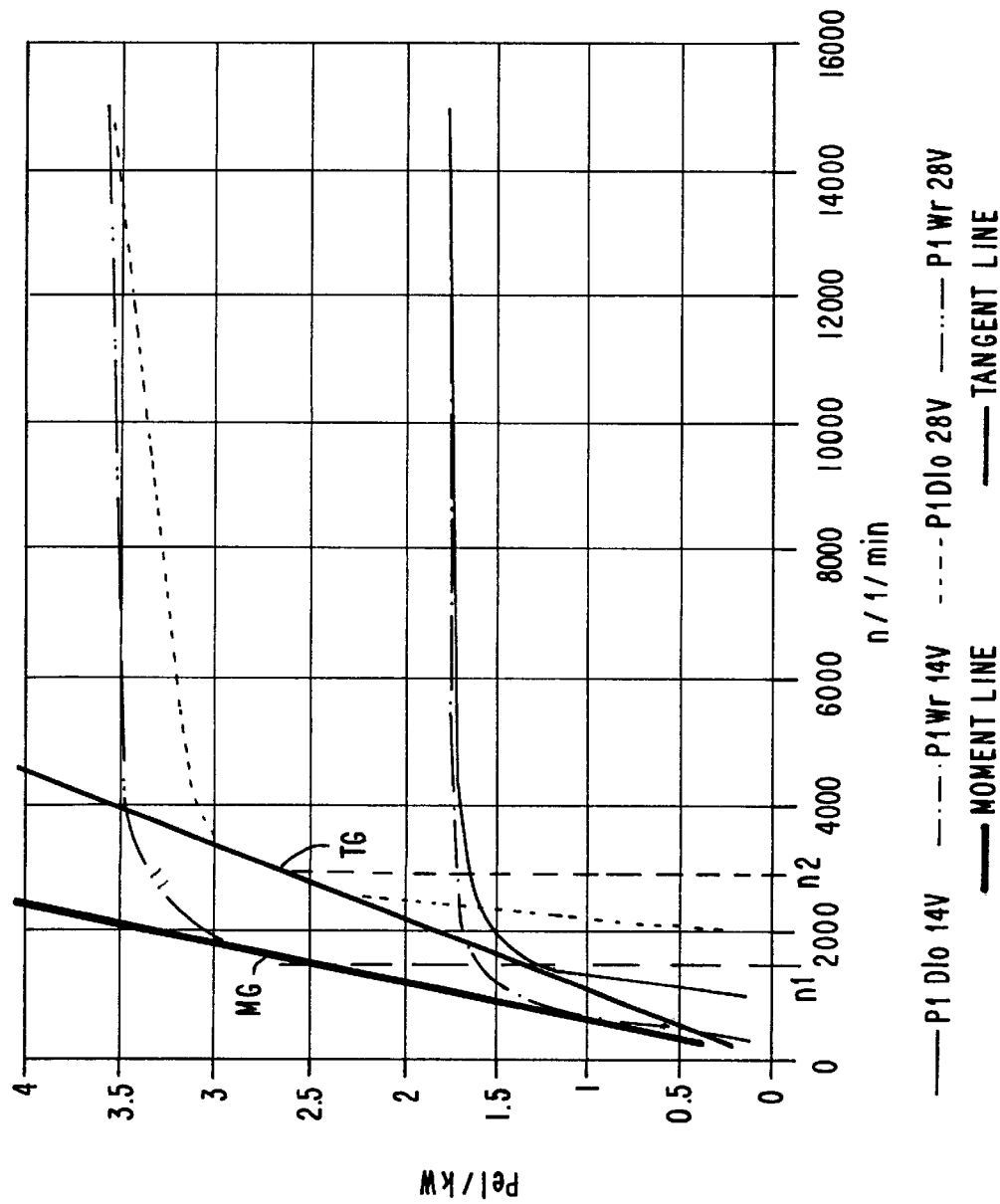
FIG. 4 shows the same facts for two different output voltages, wherein characteristic curves are shown for a generator with a passive diode bridge and for a generator with inverters for different output voltages.
Figure 5:
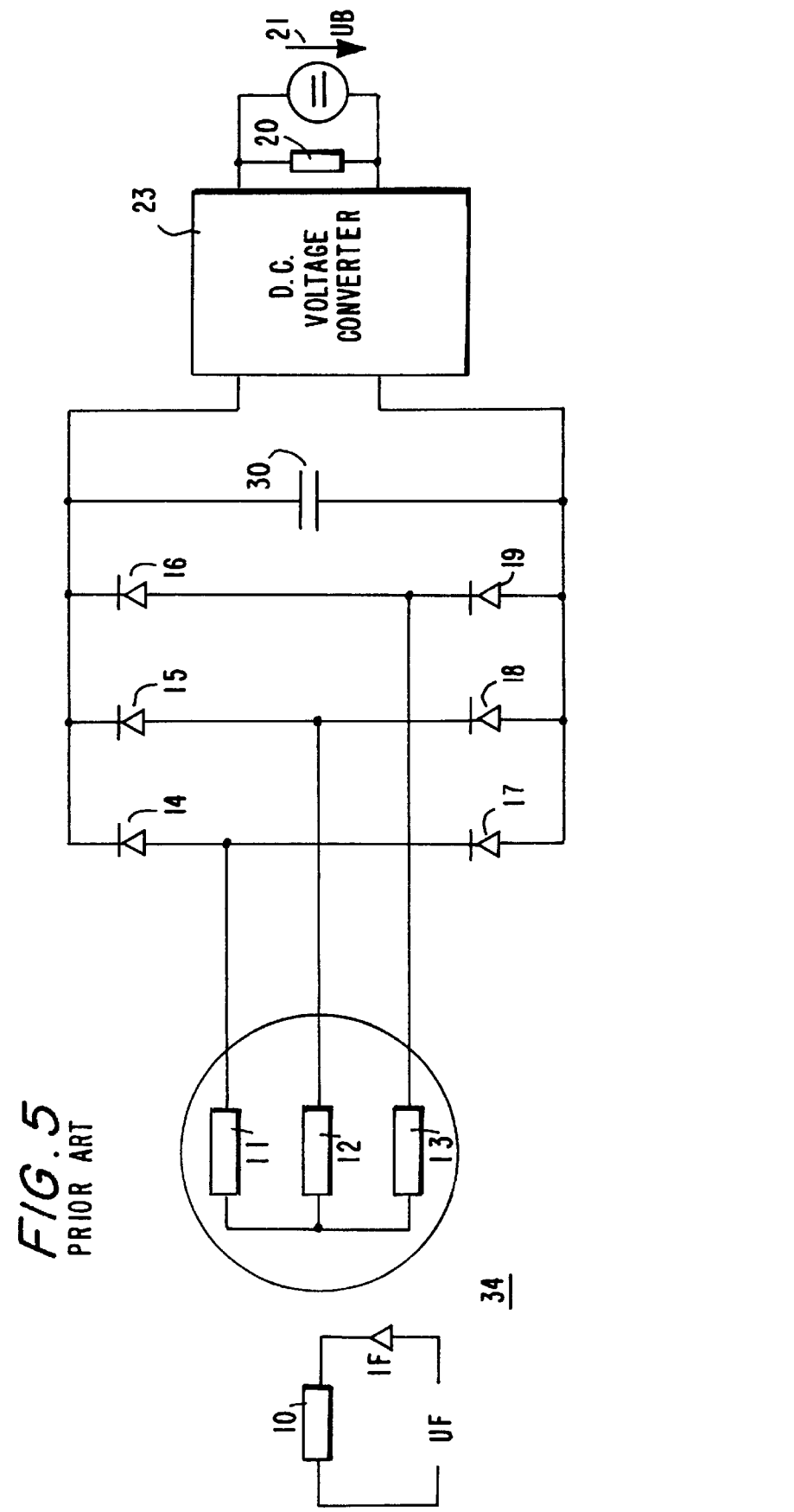
FIG. 5 shows an intrinsically known circuit arrangement of a three-phase generator, wherein an intermediary capacitor and a d.c. voltage converter are also present.

If it is assumed that the maximal flowing phase current IS at each speed is impressed into the generator, the following considerations or calculations can be carried out: at a very low speed, the voltage is still low, as a result of which the current can be impressed so that the maximal torque for this current is produced. In symmetrical machines, the field current IF and stator current IS must be aligned at right angles to each other (90°), in asymmetrical machines, the maximum is produced at slightly offset angles, for example 74°. The torque produced is 18 Nm and is twice as great as the moment at the tangent point. This current is kept in the phase position until the terminal voltage reaches its maximal value. The maximal value is achieved at the end of the base speed range, at the beginning of the field attenuation range; this is the case, for example, at approx. 770 rpm. With further speed increase, the phase angle of the stator current must be increased in relation to the excitation current IF, which reciprocally increases the existing fluxes. The induced voltage can thus be chosen as constant. At the speed n1, the generator then outputs approx. 1.6 kW instead of 1.2 kW in diode operation. The higher the speed, the more the operating points between the diode operation and the pulse inverter operation conform to one another. FIG. 4 shows the corresponding characteristic curves, wherein the power Pe[kW] is respectively plotted over the speed n[1/min] for two different voltages and for operation with diodes as well as with inverters. In addition, the moment line MG and the tangent line TG are plotted, as are the speeds n1 and n2, which characterize the tangent line.

As is clear in FIG. 4, in the operation with pulse inverters, particularly at low speeds, decisive improvements are achieved in the power output. The power increase is particularly pronounced if the characteristic curves are compared with doubled battery voltage. In diode operation at a fixed voltage, the switch-on speed nE doubles; at the speed n1, the generator cannot output any power. In operation with free voltage, the operation can occur along the tangent line TG. The maximal power output at n1 is 1.2 kW. The invention permits an operation along the moment line MG. At the speed n1, the generator can then produce almost 2.5 kW. The same generator is required for the three operating modes. As mentioned above, the effect of a power increase by means of a battery voltage increase can be achieved just as well with a single battery voltage by reducing the winding speed.

In order to be able to carry out the method according to the invention, it is necessary that a position and speed sensor 33 be provided, which detects the speed of the generator and/or of the internal combustion engine driving the generator. This speed is then evaluated in the regulating device 32 and taken into account when determining the control signals. A limitation of the thermally permissible maximal current could be similar to that in conventional generators. At speeds above 6000 rpm, a changeover can be made to a conventional regulation if need be since it is not necessary then to impress the current with the pulse inverter. In this instance, through corresponding control, the pulse inverter can be changed over to the classic diode operation and the power can be regulated solely through the influence of the excitation current.

As in the operation with free voltage, when there is a sufficiently high operating voltage, the generator can achieve an efficiency of up to 80%. The efficiency of the pulse inverter is primarily determined by the switches. Together with possibly occurring conductance losses in the switches, an overall efficiency of distinctly more than 70% could be achieved. The pulse inverter stabilizes the voltage so that another electronic stage is not required for keeping the voltage constant or for converting the voltage and therefore also does not lead to any further losses. At high speeds, the pulse inverter can easily be operated as a diode bridge which then reduces the losses to the diode conductance losses.

Since the above-described generator with pulse inverters functionally corresponds to a highly dynamic servo drive, the output can also be influenced in a highly dynamic way. A corresponding regulating design of the regulating device that controls the pulse inverter elements makes it possible to manage the load shedding with considerably lower overvoltages than is the case with conventional generators and conventional voltage regulators.

The use of the pulse inverter concept also permits a motor operation, i.e. the generator can be used as a motor, for example a starter motor. The above-mentioned moment of 18 Nm can be produced just as well in motor operation. With temporary overcurrent, an overload of 50 to 100% can be achieved. A torque of this kind can be used as a synchronizing aid when switching gears or, with a corresponding translation, can also be used to start internal combustion engines.

Likewise, a generator operation by means of temporary overload can also achieve operating points on straight lines, which are even more steeply inclined than the moment line for long-lasting short circuit current. This overload can relate to the stator as well as to the excitation circuit. During operation in the overload state, temperature measurements can be carried out at particularly critical points in the overall system and a termination of the overload when critical temperatures are reached can be triggered by the regulating device through suitable control signals.

What is claimed is:

1. A method for regulating a generator that can be driven by an internal combustion engine, in particular a three-phase generator in a motor vehicle, with an excitation coil through which the regulatable excitation current (IE) flows, to generate the excitation field, and with stator coils in which an a.c. voltage is induced through flux changes, and the stator coils are connected to the consumers via at least one pulse inverter, characterized in that the stator currents can be impressed with respect to value and phase as a function of selectable variables by means of a control of the pulse inverter by a regulating device.

2. The method according to claim 1, characterized in that the impression of the stator currents with respect to value and phase takes place in relation to the excitation current, and the excitation current is output and regulated as to its level by the regulating device.

3. The method according to claim 1, characterized in that the current impression takes place so that the terminal voltage can be freely adjusted between a maximal possible terminal voltage and zero.

4. The method according to claim 1, characterized in that the regulating device determines the current impression as a function of variables that can be supplied.

5. The method according to claim 1, characterized in that the control of the pulse inverters for current impression occurs so that a generator voltage is adjusted that equals approx. 14 V or 28 V.

6. The method according to claim 1, characterized in that a current is impressed which delivers the maximal torque for this current while taking into consideration the maximal voltage, and at higher speeds, particularly after the terminal voltage has reached its maximal value, a current is impressed which leads to a field attenuation.

7. The method according to claim 1, characterized in that the control of the pulse inverters takes place above a predeterminable speed so that the action of the pulse inverter elements corresponds to the action of diodes.

8. The method according to claim 1, characterized in that the control of the pulse inverter at least temporarily occurs so that the generator functions in motor operation, wherein it produces a torque and can be used to start internal combustion engines or as a synchronization aid when switching gears or as a servo drive.

9. A device for executing the method according to claim 1, characterized in that the pulse inverter includes power MOSFETs as controllable elements, which communicate with the regulating device and contain an integrated inverse diode.

10. The method according to claim 9, characterized in that the regulating device is a component of the control unit of the engine or of a voltage regulator and includes at least one microprocessor.

11. The method according to claim 1, characterized in that at least one temporary overload in the motor or in the generator operation is permitted, wherein the regulating device sends corresponding control signals to the pulse inverter which lead to an overcurrent.

12. The method according to claim 11, characterized in that the operation in the overloaded range is terminated by the regulating device if critical operating states are possible, in particular a thermal overload.

13. The method according to claim 1, characterized in that the generator is operated at least temporarily as a motor, wherein the required motor moment is produced through control of the pulse inverter.

* * * * *